United States Patent [19]

Campanini

[11] Patent Number: 4,654,784
[45] Date of Patent: Mar. 31, 1987

[54] CIRCUIT ARRANGEMENT FOR ROUTING SIGNALS BETWEEN A MASTER-SLAVE PAIR OF CONTROLLING PROCESSORS AND SEVERAL MASTER-SLAVE PAIRS OF CONTROLLED PROCESSING UNITS

[75] Inventor: Giorgio Campanini, Bareggio, Italy

[73] Assignee: Italtel Societa Italiana Telecomunicazioni s.p.a., Milan, Italy

[21] Appl. No.: 452,202

[22] Filed: Dec. 22, 1982

[51] Int. Cl.$^4$ ............................................. G06F 11/20
[52] U.S. Cl. .................................... 364/200; 380/827; 379/274
[58] Field of Search ................... 371/8, 9, 11; 370/16, 370/63; 364/200, 187, 900, 131, 132, 133, 137, 138, 184; 179/18 EA, 18 ES, 18 EE, 26, 6.3; 455/8, 15; 340/79, 80, 825.01, 0.02, 825.06

[56] References Cited

U.S. PATENT DOCUMENTS

| | | | |
|---|---|---|---|
| 3,681,694 | 8/1972 | Sarati | 325/2 |
| 3,882,455 | 5/1975 | Heck et al. | 340/146.1 BE |
| 4,011,542 | 3/1977 | Baichtal et al. | 340/147 LP |
| 4,030,069 | 6/1977 | Henrickson et al. | 340/147 SC |
| 4,059,736 | 11/1977 | Perucca et al. | 179/175.2 R |
| 4,081,611 | 3/1978 | Bovo et al. | 179/15 AT |
| 4,144,407 | 3/1979 | Zaffignani et al. | 178/50 |
| 4,257,099 | 3/1981 | Appelt | 364/200 |
| 4,365,247 | 12/1982 | Bargeton et al. | 340/825.01 |
| 4,499,336 | 2/1985 | Krikor et al. | 179/18 ES |

OTHER PUBLICATIONS

"Reliable Systems: Design and Tests", Eric J. Lerner, IEEE Spectrum (Oct. 1981).

*Primary Examiner*—Gareth D. Shaw
*Assistant Examiner*—Jonathan C. Fairbanks
*Attorney, Agent, or Firm*—Karl F. Ross; Herbert Dubno

[57] ABSTRACT

A plurality of switching modules, e.g. components of a digital telephone exchange, each include a pair of central processing units (CPUs) operating in master-slave relationship under the supervisory control of two support processors alos constituting a master-slave pair. Each support processor communicates via a respective bus with all switching modules by way of respective signal lines extending from that bus to one CPU of each pair. Each signal line includes two closely juxtaposed, cascaded interfaces each of which, in turn, has an externally and an internally accessible input/output (I/O) section. The externally accessible I/O section of each interface inserted in the active line between the master processor and the master CPU of any module is normally operational and communicates by an in-line link with the corresponding I/O section of the interface in cascade therewith. If that link breaks down, the connection is re-established through the hitherto nonoperational internally accessible I/O sections of these interfaces and of the two other interfaces paired therewith. In the event of a malfunction of an interface tied to the bus of the master processor, a coupler temporarily interconnects the two buses during a time slot allocated to the affected module in order to switch the connection to the in-line link extending between the other two cascaded interfaces serving that module. A malfunction of the master CPU of a module, or of the interface directly connected thereto, causes a similar switchover with assignment of the master role to the other CPU but without change in the master/slave relationship of the support processors.

3 Claims, 3 Drawing Figures

CIRCUIT ARRANGEMENT FOR ROUTING SIGNALS BETWEEN A MASTER-SLAVE PAIR OF CONTROLLING PROCESSORS AND SEVERAL MASTER-SLAVE PAIRS OF CONTROLLED PROCESSING UNITS

FIELD OF THE INVENTION

The present invention relates to a circuit arrangement in a telecommunication system for the routing of signals between a pair of controlling processors, functioning in a master-slave relationship, and several pairs of controlled processing units also operating in a relationship of the same type.

BACKGROUND OF THE INVENTION

As is well known in the art, the members of such a master-slave pair normally operate in synchronism though only the master communicates with associated peripheral units or other external components. Upon the occurrence of a failure in one of these members, the latter is dissociated from its twin which thereupon takes over the role of master if not already so designated.

In commonly owned U.S. application Ser. No. 347,315, filed Feb. 9, 1982 by Maria Grazia Corti et al as a continuation-in-part of an earlier application now abandoned, Ser. No. 293,997 filed Aug. 18, 1981 now abandoned, there has been disclosed a telecommunication system in which two special-purpose processors, interchangeably operating as master and slave, dialogue with a support processor designed to perform auxiliary functions such as call charging and traffic monitoring. The support processor intervenes in the operation of the special-purpose processors, as by checking for the absence of malfunctions and causing a master/slave changeover if the need therefor should arise; thus, the support processor may be regarded as being of higher rank than the two processors controlled thereby.

In a telecommunication system of the kind to which the invention is applicable, a pair of alternatively activable central processing units or CPUs mated in this manner are the principal constituents of each of several switching modules forming part of a digital telephone exchange or the like. These CPUs are under the control of a pair of support processors, common to all the modules, also operating in an interchangeable master-slave relationship. Thus, a malfunction of the support processor designated as the master will result in its automatic replacement by its formerly inactive twin. Since, however, either support processor must be able to communicate with either CPU of each switching module associated therewith, a four-way interconnection is needed between the two controlling processors and the two controlled CPUs of any module. Otherwise, with one support processor controlling only one CPU of each pair, a breakdown of the master CPU of a single module would require a master/slave changeover of the two support processors and of the CPUs of each module so that a subsequent breakdown of another CPU now acting as a master could no longer be rectified without manual intervention of an operator.

The aforementioned four-way interconnection can be realized with simple cables only if the switching modules are located close to the controlling support processors. In the case of longer lines it is necessary, for reliable operation, to insert a pair of mutually complementary modems at opposite ends of each line. This makes the network of connecting lines not only complex but also rather costly.

OBJECTS OF THE INVENTION

The general object of the present invention, therefore, is to provide a simplified circuit arrangement for interchangeably linking a pair of mated controlling processors with pairs of mated CPUs forming part of a plurality of controlled switching modules in a manner insuring continued operation under various abnormal conditions.

A more particular object of the invention is to provide relatively inexpensive means in such a circuit arrangement for establishing alternative routes between the controlling processors and the controlled CPUs which can be made operational, in the event of a breakdown of a route normally used, without requiring a master/slave changeover between either the processors or the CPUs served thereby.

SUMMARY OF THE INVENTION

Thus, the invention applies to a telephone or other telecommunication system with a plurality of switching modules each provided with a first and a second CPU mated in an interchangeable master-slave relationship, these CPUs being under the alternative control of a first and a second processor that are common to all the switching modules and are also mated in an interchangeable master-slave relationship. A first set of bidirectional connections respectively extend between the first processor and the first CPU of each switching module while a second set of bidirectional connections respectively extend between the second processor and the second CPU of each module. The processor currently designated as a master dialogues via the respective connections with the CPUs designated as masters in the several switching modules.

Pursuant to the present improvement, each first connection includes a first cascade of two closely juxtaposed interfaces while each second connection similarly includes a second cascade of two such interfaces. The first and second cascades assigned to a given switching module form a processor-side interface pair associated with a module-side interface pair, only one interface of each pair being normally active. Each interface comprises two input/output or I/O sections, namely an externally accessible I/O section and an internally accessible I/O section, and each bidirectional connection includes a direct in-line link between the externally accessible I/O sections of a processor-side interface and the associated module-side interface in cascade therewith. The internally accessible I/O sections of each pair are interconnected by a normally blocked cross-link which can be unblocked, in response to commands from the master processor, by switchover means included in the interface in order to join an active interface of a processor-side pair to a hitherto inactive interface of the same pair in the event of a malfunction occurring in a master CPU normally reached via the in-line link between the externally accessible I/O section of the active interface and the corresponding section of the associated module-side interface confronting it. The unblocking of that cross-link enables the establishment of communication between the master processor and the twin of the malfunctioning CPU through the in-line link extending between the two other cascaded interfaces of the associated pairs.

Advantageously, in accordance with another feature of the invention, the first connections include a common first bus, tied to the first processor, and individual first signal lines extending from that bus by way of the first interface cascades to the respective first CPUs. Analogously, the second connections include a common second bus, tied to the second processor, and individual second signal lines extending from the latter bus by way of the second interface cascades to the respective second CPUs. With the aid of coupling means, responsive to commands from the master processor, the two buses can be interconnected to provide communication between the master processor and a hitherto inactive interface of a processor-side pair in the event of a malfunction of the hitherto active interface of that pair. This enables the establishment of an alternative connection between the master processor and the master CPU previously served by the malfunctioning interface and by the module-side interface in cascade therewith, that connection further including the unblocked cross-link which joins the internally accessible I/O sections of the associated module-side interface pair to each other.

BRIEF DESCRIPTION OF THE DRAWING

The above and other features of the invention will now be described in detail with reference to the accompanying drawing in which.

SPECIFIC DESCRIPTION

Figure 1:
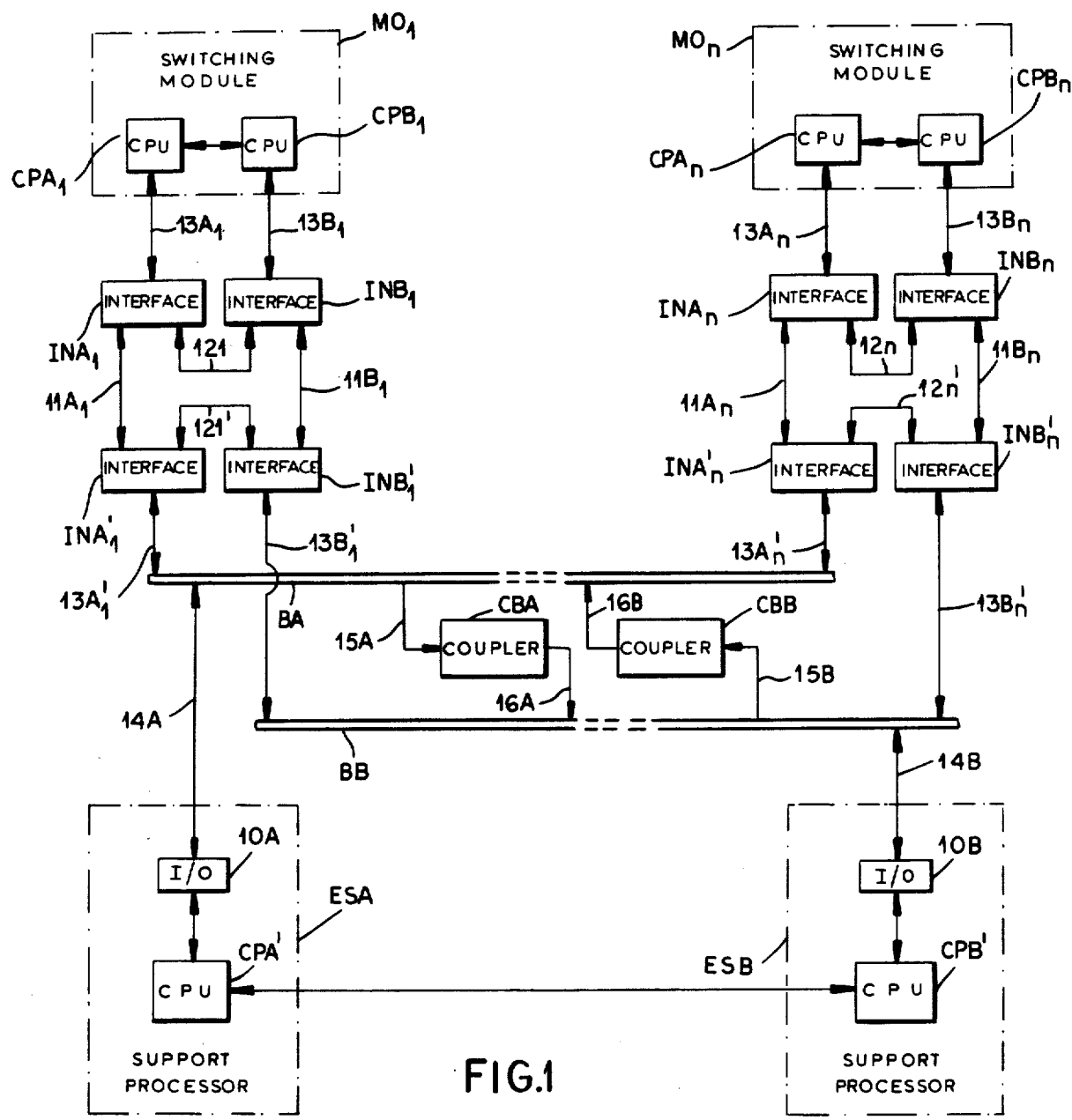
FIG. 1 is a block diagram of part of a telecommunication system provided with a circuit arrangement embodying the invention.

As shown in FIG. 1, two mutually identical switching modules $MO_1$ and $MO_n$—forming part of a larger group of such modules not further illustrated—are under the alternative control of a pair of support processors ESA and ESB mated in an interchangeable master-slave relationship as discussed above. Each module $MO_1 \ldots MO_n$ includes two similarly mated CPUs which have been designated $CPA_1$, $CPB_1$ in the case of the first module and $CPA_n$, $CPB_n$ in the case of the last module. Each module may have a structure similar to that disclosed in the above-identified commonly owned Ser. No. 347,315, its two CPUs being part of a pair of special-purpose processors interconnected by a bidirectional signal path which enables one CPU, acting as a master, to control switching operations of both these processors and communication thereof with associated peripheral units. According to the disclosure of that copending application, the two mated processors dialogue with a controlling support processor by way of a signal-transmitting network including a microprocessor and a channel allocator designed to determine which of the two mated processors is to communicate with the microprocessor during a time slot of an operating cycle of that network. The channel allocator, accordingly, implements pre-established priorities in the exchange of information between the support processor and the two mated processors controlled thereby.

As further shown in present FIG. 1, each support processor ESA, ESB includes a respective central processing unit CPA', CPB' connected, by way of an input/output unit 10A, 10B and a bidirectional signal line 14A, 14B, to an associated bus BA or BB. The first bus BA is connected via a plurality of bidirectional signal lines $13A'_1, \ldots 13A'_n$ to processor-side interfaces $INA'_1, \ldots INA'_n$ paired with interfaces $INB'_1, \ldots INB'_n$ which in turn are connected to bus BB by way of respective bidirectional signal lines $13B'_1, \ldots 13B'_n$. Each pair of processor-side interfaces $INA'_1$, $INB'_1$, $\ldots INA'_n$, $INB'_n$ confronts as associated pair of module-side interfaces $INA_1$, $INB_1$, $\ldots INA_n$, $INB_n$ closely juxtaposed therewith, corresponding interfaces of the two associated pairs being directly connected by short bidirectional in-line links $11A_1$, $11B_1$, $\ldots 11A_n$, $11B_n$ constituted by simple cables. The module-side interfaces $INA_1$, $INB_1$, $\ldots INA_n$, $INB_n$ communicate via bidirectional signal lines $13A_1$, $13B_1$, $\ldots 13A_n$, $13B_n$ with respective units $CPA_1$, $CPB_1$, $\ldots CPA_n$, $CPB_n$ of the switching modules served thereby. Each interface has an externally accessible and an internally accessible I/O section, as more fully described with reference to FIG. 2 hereinafter. The in-line links $11A_1$, $11B_1$, $11A_n$, $11B_n$ extend between the externally accessible confronting I/O sections of cascaded interfaces $INA_1/INA'_1$, $INB_1/INB'_1$, $INA_n/INA'_n$ and $INB_n/INB'_n$, respectively. The internally accessible I/O sections of each pair are interconnected by two-way cross-links 121 and 121' on the module and the processor sides in the case of module $MO_1$ and by similar cross-links 12n and 12n' in the case of the module $MO_n$. The quartet of interfaces associated with each module effectively replaces the aforementioned channel allocator disclosed in the commonly owned application.

Also illustrated in FIG. 1 are a pair of couplers CBA, CBB which under certain conditions, more fully described hereinafter with reference to FIG. 3, interconnect the two buses. Coupler CBA is connected to buses BA and BB via respective input and output lines collectively designated 15A and 16A; similarly, coupler CBB has input and output lines 15B and 16B respectively connected to buses BB and BA.

Figure 2:
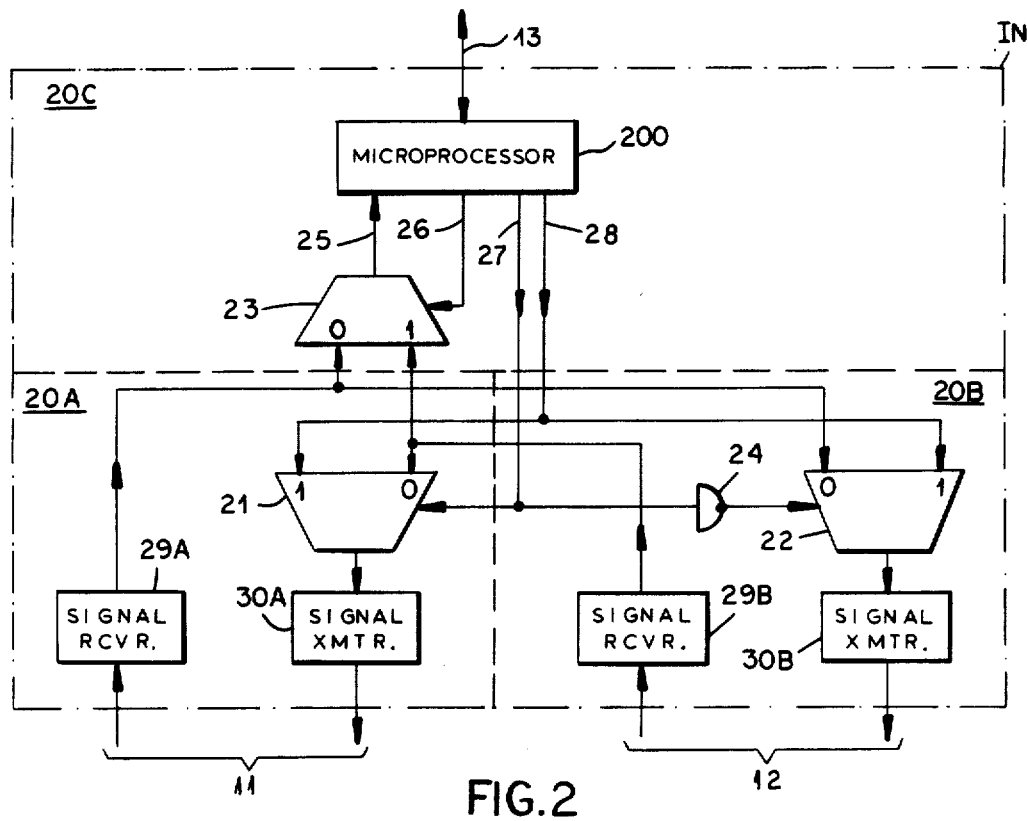
FIG. 2 is a more detailed diagram of a representative interface included in the circuitry of FIG. 1.

FIG. 2 shows details of a generic interface IN representative of any of the interfaces illustrated in FIG. 1. The interface comprises an externally accessible I/O section 20A, an internally accessible I/O section 20B and a switchover section 20C. An incoming and an outgoing branch of a generic in-line link 11 are respectively connected to a signal receiver 29A and a signal transmitter 30A in I/O section 20A. Similarly, a signal receiver 29B and a signal transmitter 30B are respectively connected to an incoming and an outgoing branch of a generic cross-link 12. An output line of receiver 29A extends to a No. 0 data input of a multiplexer 22 in section 20B and to a corresponding data input of a multiplexer 23 in section 20C. An output line of receiver 29B extends to a No. 0 data input of a multiplexer 21 in section 20A and to a No. 1 data input of multiplexer 22 in section 20B. Multiplexers 21 and 22 have output lines respectively terminating at signal transmitters 30A and 30B.

Switchover section 20C further includes a microprocessor 200 connected via a bidirectional signal line 13 to the corresponding CPU of the associated switching module or to one of the buses BA, BB shown in FIG. 1. Microprocessor 200 is further tied to an output line 25 of multiplexer 23 and has an output lead 26 terminating at a switching input of that multiplexer, a similar lead 27 connected directly to a switching input of multiplexer 21 and via an inverter 24 to a switching input of multiplexer 22, as well as an output line 28 terminating at respective No. 1 data inputs of these latter multiplexers. As long as no malfunction information is stored in a memory of the microprocessor and there are no messages to be sent from the latter to the outgoing branch of link 11, leads 26 and 27 are de-energized so that multiplexers 21 and 23 stand on their No. 0 data inputs while multiplexer 22 stands on its No. 1 data input. As a result, signals incoming over link 11 are channeled by receiver 29A and multiplexer 23 to microprocessor 200 for conversion into instructions outgoing over line 13 whereas instructions incoming over that line give rise to signals delivered by way of line 28, multiplexer 21 and transmitter 30A to the outgoing branch of link 11. Thus, only I/O section 20A is operational under these circumstances. However, any signal arriving on the incoming branch of cross-link 12 at receiver 29B would be sent via multiplexer 21 and transmitter 30A to the outgoing branch of in-line link 11.

If a defect reported to microprocessor 200 calls for a rerouting of signals arriving on link 11, the microprocessor energizes its output lead 27 so that multiplexers 21 and 22 are switched. An incoming signal will then pass from receiver 29A via multiplexer 22, transmitter 30B and cross-link 12 to I/O section 20B of the twin of interface IN where it will reach the receiver 29B; with that other interface in its normal state, the signal will continue through multiplexer 21 and transmitter 30A of I/O section 20A thereof to the outgoing branch of the corresponding in-line link 11 for retransmission to the interface in cascade with the twin of interface IN.

Microprocessor 200, operating according to a predetermined protocol established by its programmer in the usual manner, also receives such an incoming signal via multiplexer 23 in the de-energized state of lead 26 but will not emit messages on line 13 in response thereto, except possibly for testing operations commanded by that signal. When the microprocessor is instructed to make itself accessible to receiver 29B instead of receiver 29A, it energizes the lead 26 whereby the incoming branch of cross-link 12 is placed in communication with the outgoing branch of line 13 rather than with that of link 11. By controlling the voltage level on lead 27, microprocessor 200 also determines whether signals emitted on its own output line 28 are to go to transmitter 30A or 30B. Time slots respectively allocated to the transmission of signals to and from a given interface IN are established by a non-illustrated clock common to all interfaces and CPUs.

Figure 3:
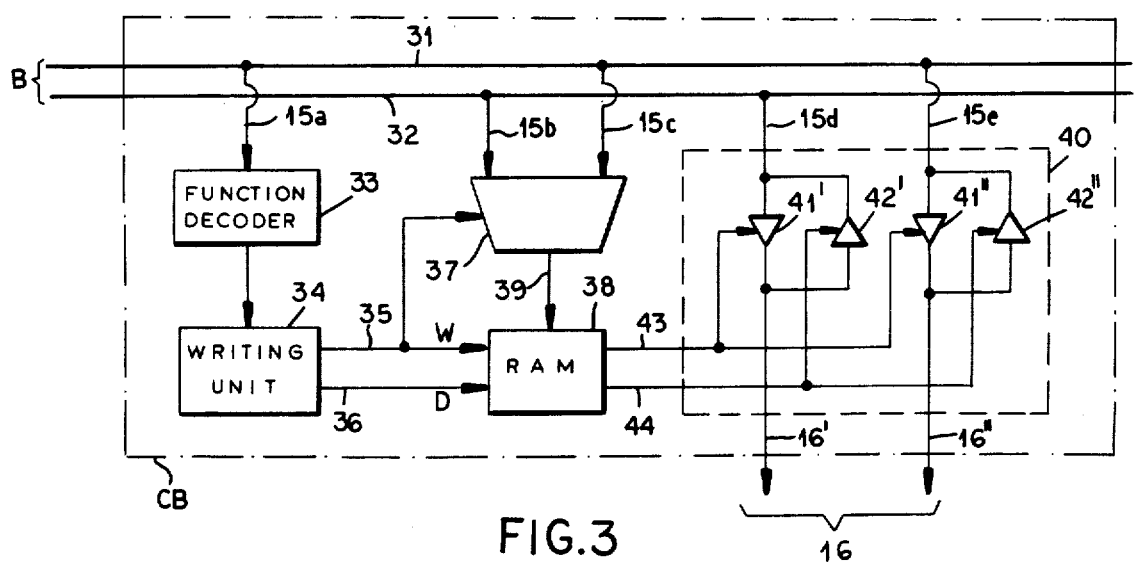
FIG. 3 shows details of a coupler also forming part of that circuitry.

FIG. 3 shows a bus B, representative of either of the two buses BA and BB of FIG. 1, as well as a generic coupler CB with inputs connected thereto. Bus B encompasses a number of multi-lead branches including an address branch 31 and a data branch 32. Input multiples 15a, 15c and 15e, tied to address branch 31, as well as input multiples 15b and 15d, tied to data branch 32, collectively represent the line 15A or 15B of FIG. 1; lines 16A and 16B are generically represented in FIG. 3 by a connection 16 comprising two output multiples 16' and 16''.

Input multiple 15a terminates at a function decoder 33 working into a writing unit 34 with output leads 35 and 36 connected to a random-access memory or RAM 38. An extension of lead 35 terminates at a switching input of a multiplexer 37 with data inputs tied to multiples 15b and 15c. A transfer network 40 in coupler CB comprises two pairs of normally cut-off amplifiers 41', 42' and 41'', 42''; amplifiers 41' and 42' are inserted in opposite directions each other between multiples 15d and 16' whereas amplifier pair 41'', 42'' is similarly inserted between multiples 15e and 16''. Unblocking inputs of amplifiers 41', 41'' and of amplifiers 42', 42'' are connected to respective output leads 43 and 44 of RAM 38 which is addressable by an output multiple 39 of multiplexer 37.

RAM 38 comprises a multiplicity of cells respectively assigned to all processor-side interfaces of the set $INA'_1$ ... $INA'_n$ or $INB'_1$ ... $INB'_n$ (FIG. 1) directly linked with bus B. Each cell stores information indicating the intact or defective state of the corresponding interface, advantageously in the form of a data bit "0" or "1". At the beginning of operations, with all interfaces presumed to be in proper condition, a data bit "0" is loaded into each of these cells. Thereafter, an identification code assigned to such a cell appears on address branch 31 in any time slot during which the processor connected to bus B desires to communicate with the switching module served by the interface so identified. If a defect-indicating data bit "1" has been loaded into the addressed cell, RAM 38 energizes its output leads 43 and 44 in order to unblock the transfer network 40, thereby establishing two-way communication between branches 31, 32 of bus B and the analogous branches of the other bus. These buses may also include further leads, not shown, which carry commands and information not intended for couplers CBA, CBB and which are simultaneously interconnected by similar, nonillustrated sections of network 40.

When one of the interfaces served by bus B is found to be defective, the associated support processor emits on the address branch 31 of that bus a particular code which is detected by function decoder 33, causing it to activate the writing unit 34. The latter thereupon emits a write-enable signal W on its output 35 whereby the output multiple 39 of multiplexer 37 is switched from input multiple 15c to input multiple 15d tied to data branch 32. The special code present on address branch 31 is accompanied by an identification, on data branch 32, of the memory cell assigned to the defective interface which is therefore simultaneously addressed by way of multiple 39. Unit 34 loads the addressed memory cell with a malfunction bit D of logical value "1" on its data output 36 after which the multiplexer 37 is returned to its normal position upon the disappearance of signal W. When the same cell is subsequently addressed via branch 31, its contents will not be changed while transfer network 40 is activated as described above. As soon as the defect has been remedied, however, another special code on address branch 31 re-initiates the aforedescribed loading operation, except that output 36 of unit 34 now carries a data bit $\overline{D}$ of logical value "0" to be written in the cell assigned to the reconditioned interface.

Multiplexer 37 could be omitted if the input multiple 15a of function decoder 33 were connected to data branch 32 instead of address branch 31 which in that case would be permanently tied to address multiple 39 of RAM 38. In such a case, of course, the support processor would emit the memory-loading code to branch 32 of bus B at the same time that the address of the affected cell appears on branch 31. Since, however, the identification codes present in different time slots on address branch 31 are also detected by the microprocessors of the respective processor-side interfaces, the arrangement shown in FIG. 3 has the advantage of avoiding an untimely activation of such a microprocessor. If the same identification code is used for both interfaces of any processor-side pair, the activation of transfer network 40 will let the address of a defective interface be detected by the microprocessor of its twin.

In the following description of the operation of the present system it will be assumed that support processor ESA operates as the master, as do units CPA₁ and CPA$_n$ of modules MO₁ and MO$_n$. Thus, processor ESA normally dialogues with units CPA₁ and CPA$_n$, during time slots assigned thereto, by way of line 14A, bus BA, signal lines 13A'₁ and 13A'$_n$, processor-side interfaces INA'₁ and INA'$_n$, in-line links 11A₁ and 11A$_n$, module-side interfaces INA₁ and INA$_n$, and signal lines 13A₁, 13A$_n$. Within each active interface the signals pass between line 13 (FIG. 2) and link 11 via microprocessor 200, line 28, multiplexer 21 and transmitter 30A in one direction and via receiver 29A, multiplexer 23, line 25 and microprocessor 200 in the opposite direction during the respective time slots.

If support processor ESA detects an interruption in its communication with module MO₁, and if diagnostic procedures by that processor and possibly by other equipment localize the defect in link 11A₁, microprocessor 200 of interface INA'₁ is commanded to energize its output lead 27 so that signals emitted by the processor are rerouted in the aforedescribed manner via the cross-link 121' of the processor-side pair to the companion interface INB'₁ and from there via link 11B₁ to section 20A of module-side interface INB₁ whose microprocessor is commanded via the same path to execute a like switchover operation. Thus, the signals destined for unit CPA₁ are rerouted by way of cross-link 121 to the still active interface INA₁ for delivery to that unit by way of line 13A₁. Signals traveling in the opposite direction pass through all four interfaces by the same alternate route.

If, on the other hand, the fault is traced to a malfunction of unit CPA₁ or of the associated interface INA₁, processor ESA commands the microprocessor of interface INB₁ to establish communication via line 13B₁ with unit CPB₁ now designated as the master.

If the fault is found to lie in interface INA'₁, processor ESA directs the coupler CBA to interconnect the leads of buses BA and BB for the routing of signals from that processor by way of line 13B'₁ to interface INB'₁, bypassing its defective mate INA'₁, whence the connection extends over link 11B₁ to interface INB₁ and then either to unit CPA₁ (through interface INA₁) or to its mate CPB₁, depending on which of these CPUs acts as the master. Oppositely traveling signals will, of course, also pass over that route.

None of the aforedescribed operations affects the master status of processor ESA or of the CPUs so designated in any of the other modules. Analogous operations can be performed under the control of processor ESB, with intervention of coupler CBB if necessary.

It will thus be seen that the system embodying the invention can effectively handle a variety of abnormal circuit conditions with relatively few connections extending between support processors ESA, ESB and switching modules MO₁, MO$_n$. Modems, if any, need only be used in those bidirectional lines 13 that exceed a certain length. Since the interfaces can generally be disposed as close as desired to the modules served thereby, this may apply only to some of the lines 13A'₁–13A'$_n$ and 13B'₁–13B'$_n$ linking the processor-side interfaces with buses BA and BB.

I claim:

1. In a telecommunication system including a plurality of switching modules each provided with a first and a second CPU mated in an interchangeable master-slave relationship, first and second controlling processors common to said switching modules also mated in an interchangeable master-slave relationship, a first set of bidirectional connections respectively extending between said first processor and the first CPU of each switching module, and a second set of bidirectional connections respectively extending between said second processor and the second CPU of each switching module, a processor designated as a master dialoguing via the respective connections with the CPUs designated as masters in said switching modules for intervening in the operations thereof, the combination therewith for each switching module a first cascade of two closely juxtaposed interface circuits herein referred to as a first interface and a second interface in each of said first bidirectional connections and a second cascade of two closely juxtaposed interface circuits herein referred to as a third interface and a fourth interface in each of said second bidirectional connections, said first interface and said third interface assigned to a given switching module forming a processor-side interface pair and said second interface and said fourth interface assigned to a given switching module forming a module-side interface pair, only one of said interfaces of each said interface pairs being normally active, each of said interfaces comprising an externally accessible input/output section and an internally accessible input/output section, each of said bidirectional connections including an in-line link between the externally accessible input/output section of one of said processor-side interface pairs and the associated module-side interface pair in cascade with each other, the internally accessible input-output section of each pair being joined together by a normally blocked cross-link, each of said interfaces further comprising switchover means responsive to commands from the master processor for unblocking the cross-link connecting an active interface of a processor-side pair to a hitherto inactive interface of the same pair upon a malfunction of a master CPU reached via the in-line link between the externally accessible input/output section of the active interface and the corresponding input/output section of the module-side interface in cascade therewith whereby communication between the master processor and the mate of the malfunctioning CPU is established through the in-line link extending between the other two interfaces of the associated pairs, said first bidirectional connections including a common first bus accessed by said first processor and individual first signal lines extending from said first bus by way of said first cascade to the respective first CPU, said second bidirectional connections including a common second bus accessed by said second processor and individual second signals extending from said second bus by way of said second cascade to the respective second CPU, said first and second bidirectional connections further comprising coupling means responsive to commands from the master processor for interconnecting said first bus and said second bus to provide communication between the master processor and a hitherto inactive interface of a processor-side pair upon a malfunction of the hitherto active interface of the same pair with establishment of an alternative connection between the master processor and the master CPU previously served by the malfunctioning interface and by the module-side interface in cascade therewith, said alternative connection including the unblocked cross-link interconnecting the internally accessible input/output sections of the associated module-side interface pair, wherein said first bus and said second bus each includes an address branch and a data branch, said coupling means comprising a first coupler, an input of said first coupler being connected to said first bus and a second coupler being connected to said second bus, an output of said first coupler being connected to said second bus, output of said second coupler being connected to said first bus, said first and second couplers each including a memory means, said memory means of said first coupler with memory cells respectively allocated to the processor-side interfaces served by said first bus and said memory means of said second coupler with memory cells respectively allocated to the processor-side interfaces served by said second bus, said memory cells storing data indicating malfunctions of the respective interfaces, each of said couplers further including normally inoperative transfer means inserted between said input and output of each of said couplers, for exchanging addresses and data between corresponding branches of said buses, said memory means being coupled to said transfer means, rendering said transfer means operative in the presence of a code on the address branch of the associated bus identifying a memory cell storing malfunction-indicating data.

2. The combination defined in claim 1 wherein each of said interfaces further comprises a microprocessor connected to said first bus in the case of a processor-side interface connected to said first bus, to said second bus in the case of a processor-side interface connected to said second bus, and to the associated CPU in the case of a module-side interface, said switchover means being controlled by said microprocessor in response to commands arriving over the respective bidirectional connections.

3. The combination defined in claim 1 wherein each of said couplers further includes decoding means connected to said input for writing and cancelling malfunction-indicating data in a memory cell of said memory means indentified by an address code accompanying said malfunction-indicating data.

* * * * *

UNITED STATES PATENT AND TRADEMARK OFFICE
CERTIFICATE OF CORRECTION

PATENT NO. : 4,654,784

DATED : March 31, 1987

INVENTOR(S) : Giorgio Campanini

It is certified that error appears in the above-identified patent and that said Letters Patent is hereby corrected as shown below:

On the Title Page Add

-- [30] Foreign Application Priority Data

Dec. 23, 1981    Italy........25809A/81  --.

Signed and Sealed this

Fifteenth Day of September, 1987

*Attest:*

DONALD J. QUIGG

*Attesting Officer*    *Commissioner of Patents and Trademarks*